United States Patent
Kodama et al.

[11] 3,922,080
[45] Nov. 25, 1975

[54] PROJECTION APPARATUS USING ADDITIVE MIXTURE OF COLORS

[75] Inventors: Akira Kodama, Murayama; Mamoru Yaegashi; Shoichi Nishida, both of Toyota, all of Japan

[73] Assignees: Zaidanhojin Nippon Shikisai Kenkyusho, Tokyo; Toyota Jidosha Kogyo Kabushiki Kaisha, Toyota, both of Japan

[22] Filed: July 24, 1973

[21] Appl. No.: 382,158

[30] Foreign Application Priority Data
Dec. 23, 1972   Japan................... 47-1011

[52] U.S. Cl. ........................... 353/84; 353/31
[51] Int. Cl.² .............. G03B 33/06; G03B 21/00
[58] Field of Search ............ 353/31, 34, 84, 37, 94; 350/311-318; 352/42, 66; 354/100, 101; 84/464; 240/3.1, 10.1

[56] References Cited
UNITED STATES PATENTS

| | | | |
|---|---|---|---|
| 2,741,944 | 4/1956 | Gunther | 350/315 X |
| 2,934,172 | 4/1960 | Christie | 350/314 X |
| 3,089,386 | 5/1963 | Hunt | 240/3.1 |
| 3,600,076 | 8/1971 | Synder | 353/1 |
| 3,768,898 | 10/1973 | Yost | 353/84 |

FOREIGN PATENTS OR APPLICATIONS 1,286,236   1/1962   France ................... 353/84

*Primary Examiner*—Harry N. Haroian
*Attorney, Agent, or Firm*—Stevens, Davis, Miller & Mosher

[57] ABSTRACT

This invention relates to a projection apparatus using additive mixture of colors.

Said apparatus comprises a lamp serving as a light source, a first condenser lens collecting light emanating from said lamp and forming an image of a filament of the lamp in an area infront of the lens, a color mixing filter assembly disposed in a position in which said image of said filament of said lamp is formed, a second condenser lens arranged in a color mixing zone disposed forwardly of the assembly, a slide to be projected juxtaposed to a main surface of said second condenser lens, and a projection lens for projecting an image of said slide which is colored by mixedly colored light from said second condenser lens.

7 Claims, 13 Drawing Figures

PROJECTION APPARATUS USING ADDITIVE MIXTURE OF COLORS

This invention relates to projection apparatus using additive mixture of colors, and more particularly it is concerned with an apparatus of the type which permits a picture of high luminance to be projected on a screen or a film in a photographic camera by continuously and uniformly varying all the colors in the picture.

Heretofore, it has been customary to use a integrating sphere in which light is reflexed irregularly when colors mixture using color filters as in visual colorimeter. When such method is used, we can get only weak colored light of small area at the field of view of the colorimeter. So, the method is not suitable for judging or studying colors projected strongly on a screen of large size, by many observers simultaneously.

In one method of additive mixture of colors, different colors are projected on a screen by projectors and mixed on the screen. Several disadvantages are associated with this method. According to this method, it is not possible to color a single slide plate in different colors and project it in different colors at the same time. Besides, the operation to vary colors continuously is troublesome.

Another method is known whereby a light beam is split by mirrors into three beams which are colored by red, green and blue filters respectively and then mixed together so as to effect projection by utilizing mixture of colors. This method has disadvantages that the volume of light is greatly attenuated and the optical system used for projection is complex and large.

There is another color mixture technique varying colors continuously. It can be carried out by using several filters of mesh colored differently. These filters are superposed one on another and placed on a fixed light intercepting plate of mesh. Light is transmitted through these filters as diffused light and projected on a screen. However, the procedure to combine color filters selectively to produce expected color is troublesome. Unless milky glass plate, ground glass plate or other diffusion plate is used, mixing of colors on the surface of the screen cannot be effected satisfactorily and the colors tend to lack in uniformity. The use of the diffusion plate and light intercepting plate causes attenuation or partly interception of light and makes it impossible to project pictures of high luminance on the screen. Thus this projection method has little practical value.

First object of this invention is to provide an improved projection apparatus adapted for practical use wherein additive mixture of colors is effected on a light beam produced by a light source by placing a color mixing filter on a secondary image surface of the light source, and such light beam is projected on a screen or a film of a photographic camera, so that every color can be varied continuously and colored pictures of high luminance can be projected on the screen and watched by many persons.

Second object of this invention is to provide a projection apparatus which has a field lens system disposed adjacent to the surface of a color mixing filter so that the whole pictures projected on the screen have the uniformity of color.

Third object of this invention is to provide a projection apparatus which comprises a movable lightness adjusting plate and a movable color mixing filter, so that lightness, saturation and hue and their combination can be varied continuously and especially hue can be varied in the spectral order.

Fourth object of this invention is to provide a projection apparatus wherein the movements of the movable lightness adjusting plate and movable color mixing filter can be controlled so as to preclude breaking down of the apparatus.

Fifth object of this invention is to provide a projection apparatus comprising counters where the degree of variation in lightness, saturation and hue can be read, so that variation in color can be expressed in numbers.

Sixth object of this invention is to provide a projection apparatus which can project pictures both on a screen of large size and on a film of a photographic camera of small size.

Seventh object of this invention, that is more important, is to provide a projection apparatus which can accomplish interesting use, by using several such apparatus arranged side-by-side to project each picture on the same screen to form one image thereon. That is, researches on combination of two tones, three tones and the like or the simulation study of color variation, glossiness and quality with the true-to-life images made by combinating object, background and high-lights can be carried out.

Eighth object of this invention is to provide a projection apparatus which used reflectors so as to permit pictures projected by several such projection apparatus to form one image on a film of a photographic camera.

Ninth object of this invention is to provide a projection apparatus wherein a slide holder is provided rotatable freely so that the inclination of a slide on which a picture to be projected is printed can be adjusted.

Tenth object of this invention is to provide a projection apparatus wherein a piece of heatproof glass is mounted in a second condenser lens to prevent the heat generated by the light source lamp from adversely affecting other parts of the apparatus.

Additional and other objects and features of the invention will become evident from the description set forth hereinafter when considered in conjunction with the accompanying drawings, in which.

Figure 1:
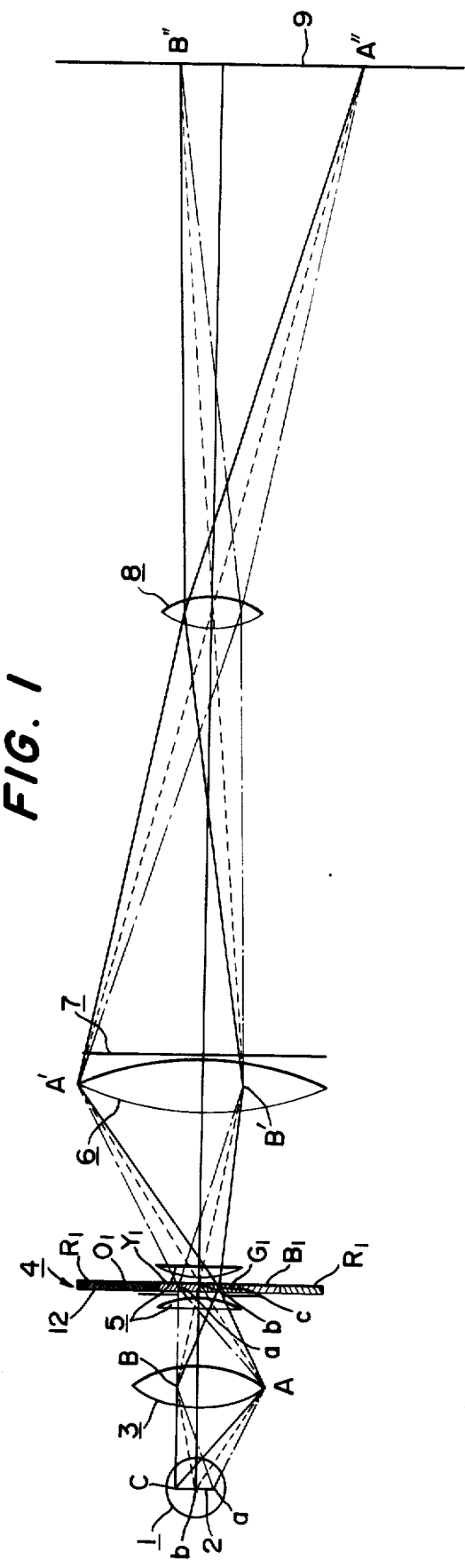
FIG. 1 is a view in explanation of the principle of the projection apparatus utilizing additive mixture of colors according to the invention.

In FIG. 1, 1 is a light source lamp which may be aa tungsten lamp or halogen lamp of white color having at least one filament 2 which may be linear in form or have some spatial extent as described later with respect to FIG. 3 and FIG. 4. The decision on the selection of filament shape is made according to the purpose.

In front of the lamp 1 are the first condenser lens 3, color mixing filter assembly 4, field lens 5, second condenser lens 6, slide 7, projection lens 8 and screen 9 arranged coaxially with one another.

Figure 2:
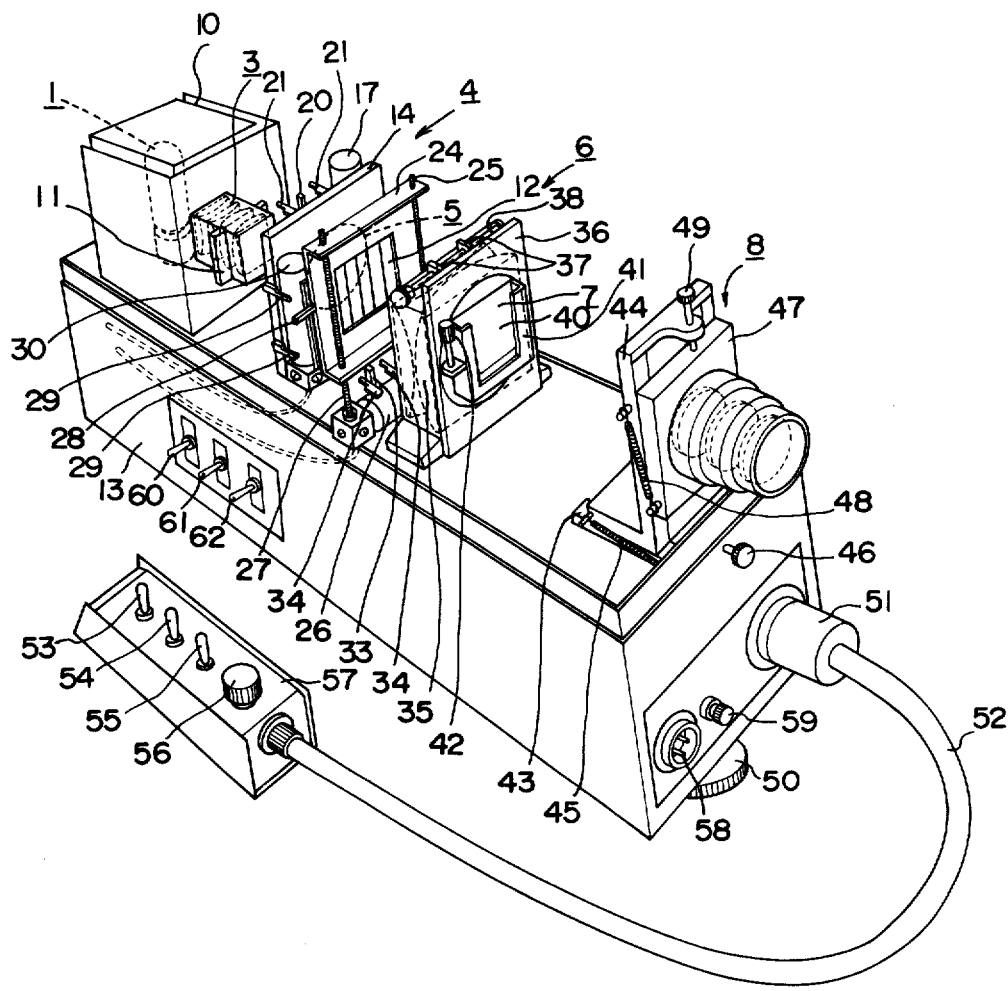
FIG. 2 is a perspective view of a preferred embodiment of the projection apparatus according to the invention from which a cover has been removed.

As shown in FIG. 2, the first condenser lens 3 is disposed at an open side of a lamp house 10 in which the lamp 1 is mounted. The first condenser lens 3 which consists of a number of lens elements having a piece of heatproof glass 11 among them is used to form an image of the filament 2 of the lamp 1 on a surface of a color mixing filter 12 of the color mixing filter assembly 4.

The color mixing filter assembly 4 will be described in detail with reference to FIG. 2 to FIG. 5. The apparatus comprises a casing 13 on which an upright fixed plate 14 is mounted. Field lens 5 is fixed at the center opening 15 of this fixed plate 14. A lightness adjusting plate 16 is mounted at one side of the fixed plate 14 that is juxtaposed to the field lens 5, and is movable in the horizontal direction. That is, lightness adjusting plate 16 moves horizontally in combination with nuts 19 fixed at it, by the rotation of feed screw 18 connected to a shaft of the motor 17. At the two ends of the plate 16 levers 20 to regulate its movement are mounted. A pair of limit switches 21 are disposed at some predetermined distance apart, that is opened and closed by the lever 20 on the plate 16.

The color mixing filter 12 is mounted on the other side of the fixed plate 14. As shown in FIG. 3, the color mixing filter 12 comprises a plurality of filter elements 23 attached to a transparent base 22. The filter elements 23 varies in color from left to right in the order of red (R), orange (O), yellow (Y), green (G), blue (B), and red (R) according to the wavelengths and each filter element varies in saturation in steps so that the uppermost portion of the filter 12 is darkest and the color becoming lighter in going downwardly along the filter 12. The filter 12 has a white zone (W) in its lowest portion. Thus the filter 12 is so-called stepped-wedge type. With this type of color mixing filter, the filament 2 of the lamp 1 is preferably of the type which emits light having a certain degree of spatial expanse.

Figure 4:
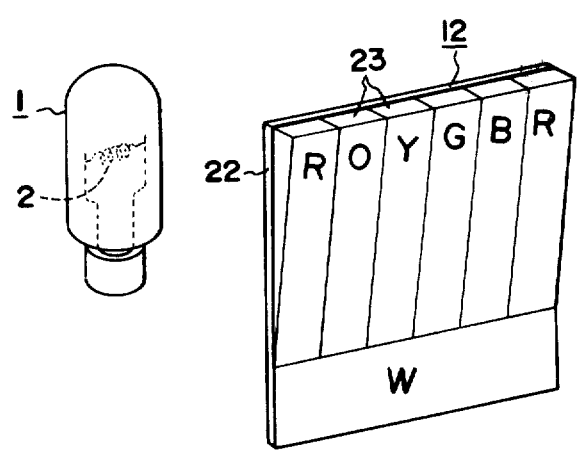

Alternatively, the filter 12 may be formed, as shown in FIG. 4, in the shape of a filter of the so-called wedge type by attaching to the transparent base 22 filter elements 23 each having a thickness gradually decreasing in going downwardly along the filter 12. When the filter of the wedge type is used, the lamp 1 used as a light source preferably has at least one filament 2 which emits light in linear form.

Figure 5:
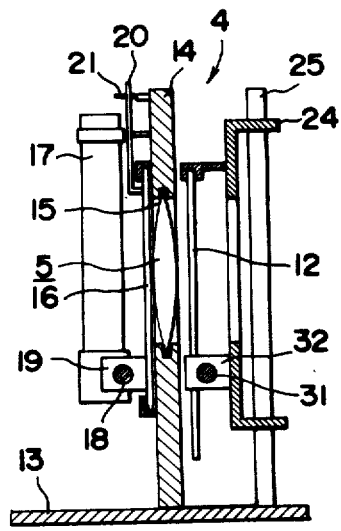
FIG. 5 is a sectional view of the color mixing filter assembly and the field lens.

The color mixing filter 12 constructed as aforementioned is mounted on a vertically movable frame 24 for movement in a direction perpendicular to the plane of FIG. 5. The frame 24 is mounted on an upstanding guide bar 25 and is connected to a feed screw 27 connected to a shaft of a motor 26 as shown in FIG. 2 for moving the frame 24 up and down. The vertical movement of the frame 24 is limited by a lever 28 secured to the frame 24 for opening a pair of limit switches 29 secured to the fixed plate 14 in vertically spaced relationship and disposed in the path of movement of the lever 28.

Fixed to the frame 24 is a motor 30 having the shaft connected to a feed screw 31 that is connected to nuts 32 secured to the color mixing filter 12, so that the filter 12 can move in a direction perpendicular to the plane of FIG. 5. The movement of the filter 12 in a horizontal direction is limited by a lever 33 secured to the filter 12 to open a pair of limit switches 34 secured to the frame 24 in horizontally spaced apart relationship and disposed in the path of movement of the lever 33.

Figure 6:
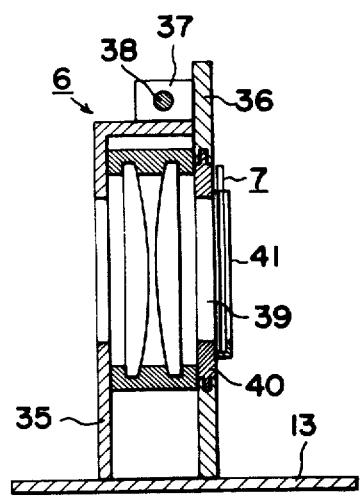
FIG. 6 is a sectional view of the second condenser lens and a slide to be projected.

FIG. 2 and FIG. 6 show the second condenser lens 6 in detail. Secured to the top of the casing 13 is a lens support frame 35 in which the second condenser lens 6 is mounted. Disposed in spaced juxtaposed relation to one surface of the lens 6 is a slide mounting plate 36 having secured to its upper end nuts 37 which threadably engage a feed screw 38 secured to the support frame 35. Thus the slide mounting plate 36 can be moved horizontally by rotating the feed screw 38.

A disc 40 formed with an opening 39 is rotatably mounted in a central portion of the slide mounting plate 36 and has attached thereto a slide holder 41 whose position can be adjusted by means of a screw 42 when the slide 7 mounted in the slide holder 41 is disposed in an inclined position.

The projection lens 8 is disposed on a foremost end portion of the casing 13. As shown in FIG. 2, the projection lens 8 comprises an L-shaped frame 44 formed with dovetail grooves, for example, engaging rails 43 on the casing 13 for the movement lengthwise of the casing 13. The L-shaped frame 44 is urged by the biasing force of a spring 45 to move into its forward position and can be moved backwardly and forwardly by manipulating a focusing screw 46. A projection lens mounting plate 47 is mounted on the L-shaped frame 44 by a dovetail connection, for example, for the movement vertically relative to the L-shaped frame 44. The projection lens mounting plate 47 is urged by the biasing force of a spring 48 to move into an upper position, and can be moved upward and downward by manipulating a screw 49.

An elevational angle adjusting screw 50 is mounted on the underside of the foremost end portion of the casing 13. Mounted on a front end of the casing 13 is a connector 51 connected through a cord 52 to a control box 57 mounting thereon normal and reverse rotation control switches 53, 54 and 55 for the motors 17, 26 and 30 respectively and a speed control knob 56 for the motors 17, 26 and 30 (particularly when the motors are DC motors). 58 is a socket connected to a power source, and 59 is a fuse holder.

Mounted on one side of the casing 13 are a change-over switch 60 for the lamp 1, a power source switch 61 for the motors 17, 26 and 30, and a power source switch 62 for the whole circuit.

Figure 7:
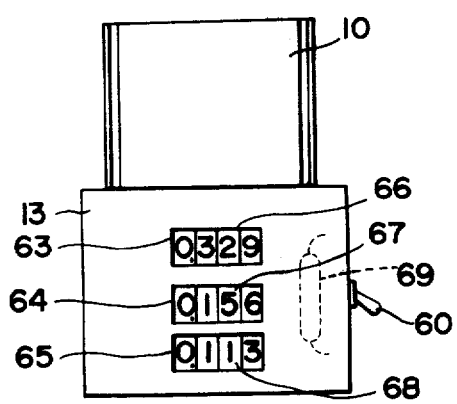
FIG. 7 is a rear end view of the counter portion attached to the apparatus.

As shown in FIG. 7, the casing 13 is formed on its rear end wih three windows 63, 64 and 65 in which counters 66, 67 and 68 are mounted which are connected to the motors 17, 26 and 30 to indicate the distance covered by the horizontal movement of the lightness adjusting plate 16, the verical movement (saturation) of the color mixing filter 12 and the horizontal movement (hue) of the color mixing filter 12 respectively. 69 is a counter indication light.

Figure 8:
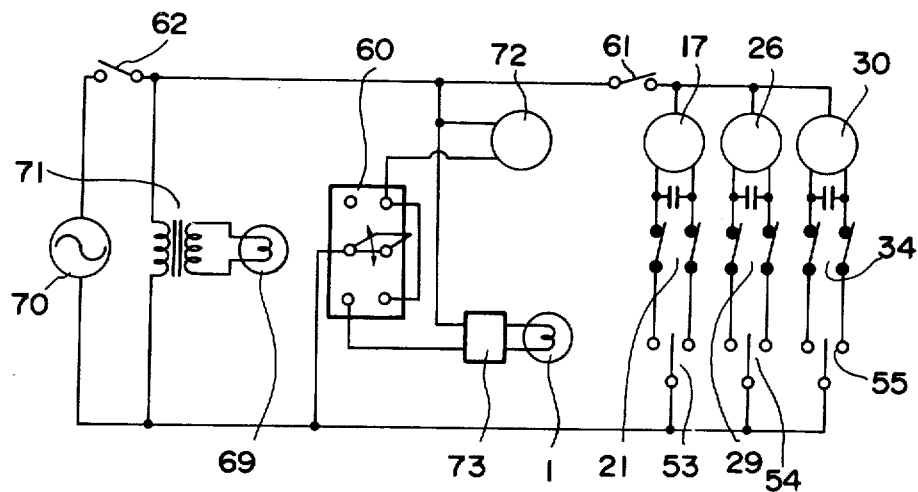
FIG. 8 is an electric circuit diagram used in the projection apparatus according to the invention.

The electric circuit shown in FIG. 8 will now be described. A power source 70 is connected to the counter indication lamp 69 through the power source switch 62 and a step-down transformer 71, to the light source lamp 1 and a cooling fan 72 through the power source switch 62 and change-over switch 60, and to the motors 17, 26 and 30 through the power source switch 62 and motor switch 61. The change-over switch 60 has two common contacts and four change-over contacts. When the common contacts are connected to the two lower change-over contacts, a current supplied simultaneously to the lamp 1 and fan 72; when the common contacts are connected to the two upper change-over contacts, a current is passed to the fan 72 only. The lamp 1 has a light volume control means 73 connected thereto. The motors 17, 26 and 30 are connected to the limit switches 29 for limiting the vertical movement of the frame 24, the limit switches 21 for limiting the horizontal movement of the lightness adjusting plate 16 and the limit switches 34 for limiting the horizontal movement of the filter 12, and to the normal and reverse rotation control switches 53, 54 and 55.

The operation of the projection apparatus constructed as aforementioned will now be described. The slide 7 is inserted in the slide holder 41 and the power source switch 62 is turned on. Then the change-over switch 60 is turned on to connect the lamp 1 and cooling fan 72 to the power source 70, and the motor switch 61 in turned on. This turns on the lamp 1, actuates the fan 72, so that the slide 7 is projected on to the screen 9.

The projection lens 8 is moved back and forth to bring it into focus by manipulating the focusing screw 46.

When it is desired to effect adjustments of lightness, the normal and reverse rotation control switch 53 for adjusting lightness is switched either to normal rotation or reverse rotation. This rotates the motor 17 in the desired direction and moves the lightness adjusting plate 16. When the adjusting plate 16 has moved to a suitable position, the switch 53 is restored to its original position to thereby stop the motor 17. The rotation of the motor 17 which is in proportion to the distance covered by the movement of the lightness adjusting plate 16 is indicated on the counter 66. When the lightness adjusting plate 16 has moved to the leftmost or rightmost position, one of the limit switches 21 is opened by the lever 20, so that the motor 17 stops rotating.

In like manner, closing of the normal and reverse rotation control switch 54 for adjusting saturation rotates the motor 26 and moves the color mixing filter 12 either upwardly or downwardly to vary saturation. Closing of the normal and reverse rotation control switch 55 for adjusting hue rotates the motor 30 and moves the color mixing filter 12 either rightwardly or leftwardly to very hue. When the filter 12 reaches the limit of its vertical or horizontal movement one of the two limit switches 29 or 34 is opened by the lever 28 or 33, thereby stopping the motor 26 or 30.

The principle of continuously varying colors will now be described with reference to FIG. 1. White light emitted by the lamp 1 is collected by the first condenser lens 3, and a secondary image of the filament 2 of the lamp 1 is formed on the color mixing filter 12 as if the lamp 1 were disposed on the color mixing filter 12. Thus the secondary image of the filament 2 of the lamp 1 is colored.

The colored light of the colored secondary image of the filament is collected by the field lens 5 and its colors undergo additive mixture of colors.

Figure 3:
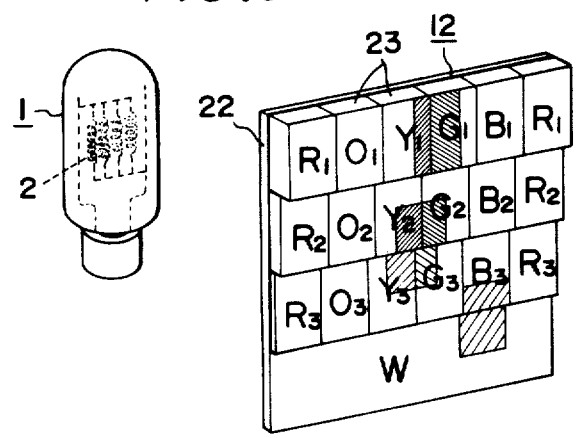
FIG. 3 and FIG. 4 are perspective views of different forms of light source lamp and the color mixing filter used in the projection apparatus according to the invention.

More specifically, when a hatched area stretching over both filter elements $Y_1$ and $G_1$ of the color mixing filter 12 shown in FIG. 3 is disposed in the square slit on the surface of the field lens 5, light transmitted through the filter element $Y_1$ and light transmitted through the filter element $G_1$ are mixed in color. That is, light emanating from a surface portion $a$–$b$ of the filament 2 of the lamp 1 will be incident on a surface portion of the filter element $Y_1$ in the slit while light emanating from a surface portion $b$–$c$ of the filament 2 of the lamp 1 will be incident on a surface portion of the filter element $G_1$ in the slit. Let us now consider light transmitted through a spot A on the surface of the first condenser lens 3. Light emanating from the surface portion $a$–$b$ of the filament 2 and reaching the spot A will be refracted by the lens 3 at the spot A and reach the surface portion of the filter element $Y_1$ of the color mixing filter 12. It will be refracted again by the field lens 5 there and form an image of the spot A on a spot A' on the surface of the second condenser lens 6.

In like manner, light emanating from the surface portion $b$–$c$ of the filament 2 will be refracted at the spot A and reach the surface portion of the filter element $G_1$, where it is further refracted by the field lens 5 so as to form an image of the spot A on the spot A'. The light emerging from the surface portion $a$–$b$ of the filament 2 is colored yellow by the filter element $Y_1$ while the light emerging from the surface portion $b$–$c$ of the filament 2 is colored green by the filter element $G_1$. Since the yellow light and the green light are simultaneously incident on the spot A' and form an image thereon, the colored light beams undergo additive mixture of colors by superposition.

Likewise, light transmitted through a spot B on the surface of the first condenser lens 3 is transmitted through the surface portions of the filter elements $Y_1$ and $G_1$ of the color mixing filter 12 and forms an image on a spot B on the surface of the second condenser lens 6. Since all the light from the filament 2 is uniformly incident on the first condenser lens 3, a multitude of spots similar to the aforementioned spots A and B are disposed contiguously on the entire surface of the first condenser lens 3, and consequently similar spots are contiguously formed on the surface of the second condenser lens 6. Thus the surface of the second condenser lens 6 is colored in brilliant colors mixed by additive mixture.

The slide 7 juxtaposed to the second condenser lens 6 is colored by the mixed colors on the surface of the lens 6 and images of the spots A', B' and other spots on the second condenser lens 6 are formed on spots A'', B'' and other spots on the screen 9 by the projection lens 8, so that an image of the slide 7 is formed on the screen 9. By rotating the motors 17, 26 and 30 in any direction as desired to move the color mixing filter 12 either vertically or horizontally, it is possible to continuously vary lightness, saturation and hue and their combination. In other words, the types of filter elements and the ratio of the area of one filter element to the area of another filter element in the square slit will undergo changes continuously, and the hue, lightness and saturation and their combination of the colored light projected by the projection lens can be varied continuously, thereby making it possible to produce light colored in any range of colors are desired.

Let us now explain a method of obtaining numerical tristimulus values X, Y and Z of projected white light or a mixed color. When the hatched area stretching over the filter elements $Y_1$ and $G_1$ is disposed in the square slit, for example, the values of X, Y and Z can be expressed by the following formulas as is well known:

$$X = SX^{Y_1} + (1-S) X^{G_1}$$
$$Y = SY^{Y_1} + (1-S)Y^{G_1}$$
$$Z = SZ^{Y_1} + (1-S)Z^{G_1}$$

where $X^{Y_1}$, $Y^{Y_1}$ and $Z^{Y_1}$ are the tristimulus values of the filter element $Y_1$; $X^{G_1}$, $Y^{G_1}$ and $Z^{G_1}$ are the tristimulus values of the filter element $G_1$; $S$ is the area of the filter element $Y_1$ and $(1-S)$ is the area of the filter element $G_1$.

In these formulas, the value of the area S alone is not known, with the tristimulus values $X^{Y_1}$, $Y^{Y_1}$, $Z^{Y_1}$, $X^{G_1}$, $Y^{G_1}$ and $Z^{G_1}$ for the filter 12 being measured beforehand and known. However, the value of the area S can readily be obtained by conversion from readings of the values representing changes in hue indicated by the counter 68. Thus the numerical tristimulus values X, Y and Z of the mixed color can be obtained from the aforementioned formulas. The saturation counter 67 indicates a value 0 at this time.

When a hatched area stretching over filter elements $Y_2$, $G_2$, $Y_3$ and $G_3$ as shown in FIG. 3 is disposed in the square slit, the values of X, Y and Z can be expressed from the following formulas:

$$X = t\ [SX^{Y_2} + (1-S)X^{G_2}] + (1-t)\ [SX^{Y_3} + (1-S)X^{G_3}]$$
$$Y = t\ [SY^{Y_2} + (1-S)Y^{G_2}] + (1-t)[SY^{Y_3} + (1-s)Y^{G_3}]$$
$$Z = t\ [SZ^{Y_2} + (1-S)Z^{G_2}] + (1-t)\ [SZ^{Y_3} + (1-S)Z^{G_3}]$$

where $S$ is the reading given on the hue counter 68, and $t$ is the reading given on the saturation counter 67. In these formulas, the values of $X^{Y_2}$, $Y^{Y_2}$, $Z^{Y_2}$, $X^{G_2}$, $Y^{G_2}$, $Z^{G_2}$, $X^{Y_3}$, $Y^{Y_3}$, $Z^{Y_3}$, $X^{G_3}$, $Y^{G_3}$, and $Z^{G_3}$ are all known and the values of $S$ and $t$ can be obtained from the counters 68 and 67 respectively, so that the numerical values of $X$, $Y$ and $Z$ can be readily obtained.

When a hatched area stretching over filter elements $B_3$ and W as shown in FIG. 3 is disposed in the square split, the values of $X$, $Y$ and $Z$ can also be expressed by the following formulas:

$$X = tX^{B_3} + (1-t)X^W$$
$$Y = tY^{B_3} + (1-t)Y^W$$
$$Z = tZ^{B_3} + (1-t)Z^W$$

The numerical values of $X$, $Y$ and $Z$ can be obtained from these formulas.

The lightness of projected colored light, which can be varied by moving the lightness adjusting plate 16 to vary its position in the square slit, can be read on the counter 66. Since the light transmissibility of the lightness adjusting plate 16 has been determined in all its positions, it is possible to determine luminance of the projected colored light by multiplying the tristimulus values of the mixed color by the light transmissibility. Similarly, the hue, saturation and lightness of the projected light can be determined numerically.

The invention has been described with reference to an embodiment in which one apparatus is used to vary the hue, saturation and lightness and their combination of mixed colors continuously. It should be noted that the invention can achieve specific results by using a plurality of apparatus arranged in side-by-side relationship.

Figure 9:
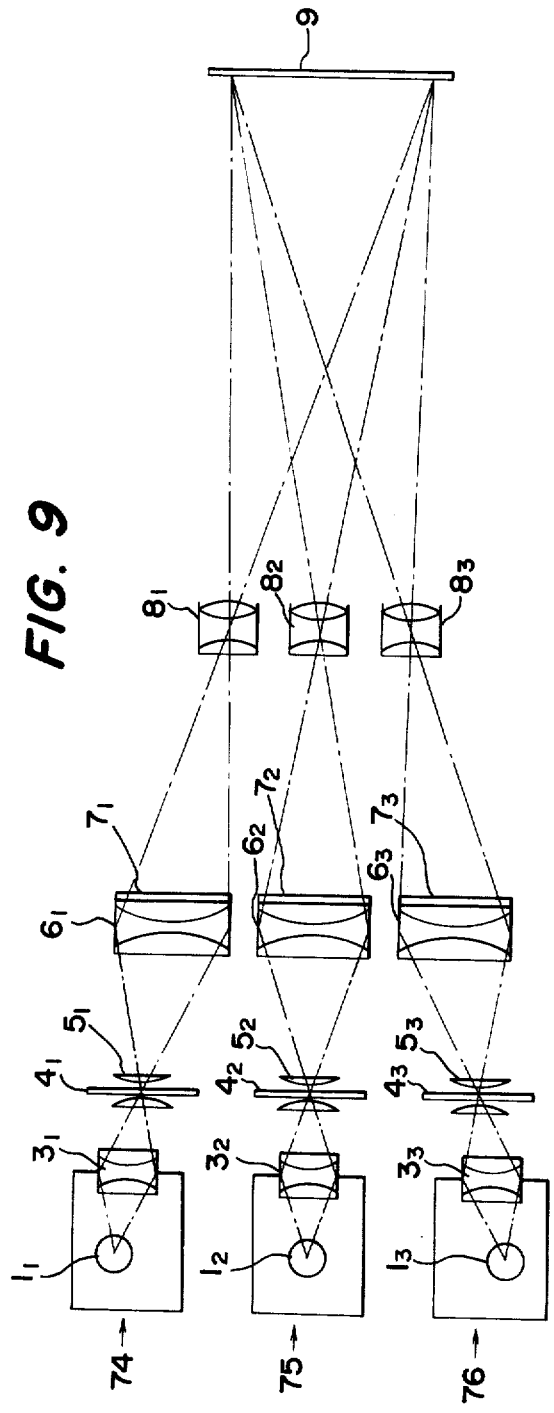
FIG. 9 shows several projection apparatus according to the invention arranged side-by-side to project pictures on the same screen.

In FIG. 9, three apparatus 74, 75 and 76 are arranged in side-by-side relationship to project images on the same screen so that all the images may coincide on the screen 9. To attain the end, it is not necessary to arrange lenses and filters such that they are at right angles to the optical axis of the respective apparatus. The distance between the projection lenses $8_1$, $8_2$ and $8_3$ and the screen 9 is much greater than the distance between the lamps $1_1$, $1_2$ and $1_3$ and the projection lenses $8_1$, $8_2$ and $8_3$, so that the lamps $1_1$, $1_2$ and $1_3$, first condenser lenses $3_1$, $3_2$ and $3_3$, filter assemblies $4_1$, $4_2$ and $4_3$, second condenser lenses $6_1$, $6_2$ and $6_3$ and projection lenses $8_1$, $8_2$ and $8_3$ have only to be parallel to the surface of the screen 9.

Figure 10:
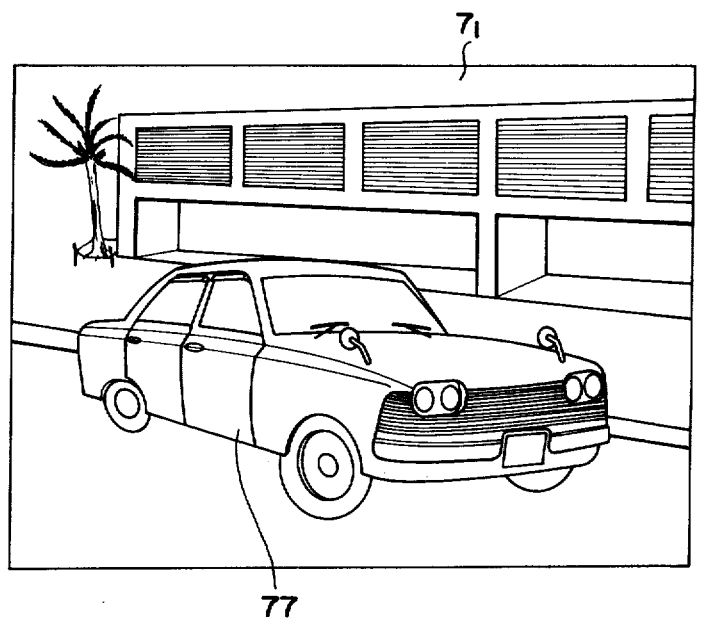
FIG. 10, FIG. 11 and FIG. 12 show slides to be projected by the projection apparatus according to the invention.

When a study of the color of the body of a motor vehicle is carried out by using a plurality of the projection apparatus according to the invention arranged in side-by-side relationship as aforementioned, a slide $7_1$ as shown in FIG. 10 is supported by the slide mounting plate 36 juxtaposed to the second condenser lens $6_1$ in the first projection apparatus 74. The slide $7_1$ has thereon a picture of an automobile standing against a certain background scenery. The body 77 of the automobile which is to be colored on the screen is painted black so that light may not be transmitted therethrough.

Figure 11:
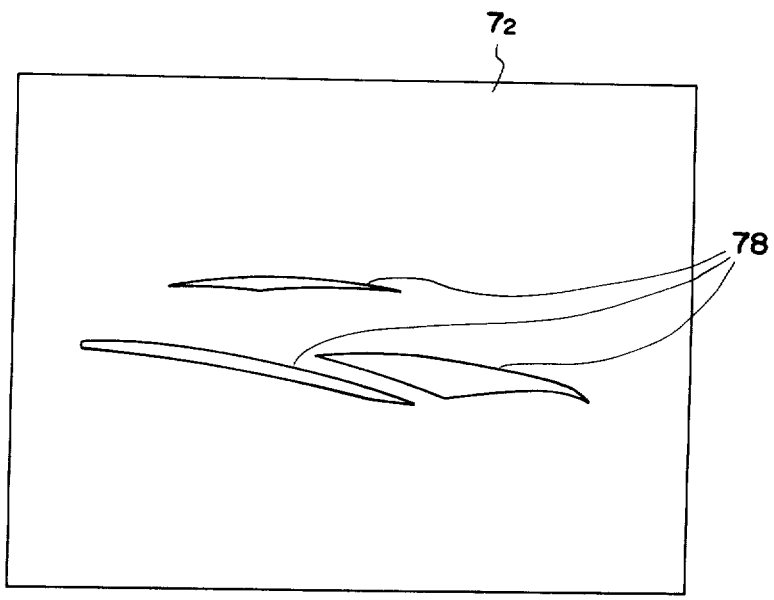
Figure 12:
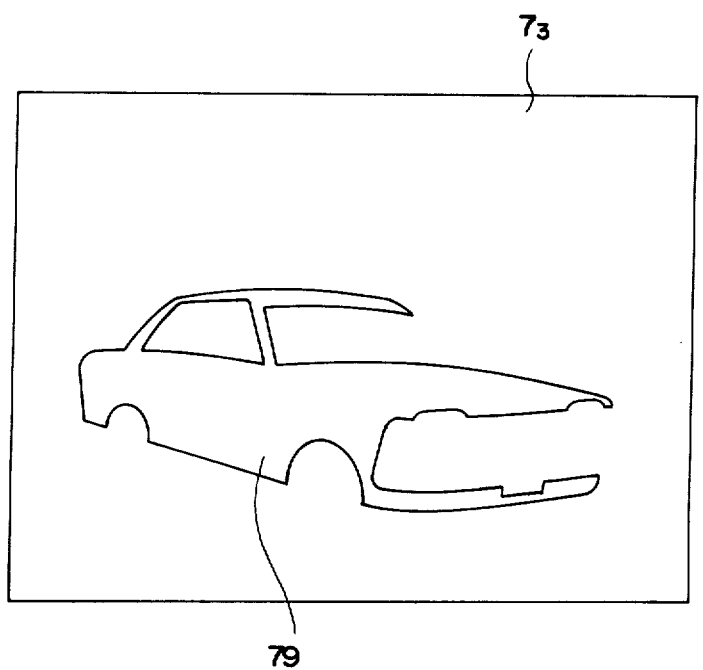

The picture of an automobile on a slide $7_2$ inserted in the second projection apparatus 75 is painted black except in high lights as shown in FIG. 11. This slide $7_2$ can give the viewer an impression of watching an automobile in three dimensions. By suitably selecting portions of an automobile is the slide to present high light effect, it is possible to provide the viewers with the opportunity of studying the material of the body or glossiness of the colors of the body. A slide $7_3$ inserted in the third projection apparatus 76 is painted black except for a body 79 of an automobile or the portion to be colored on the screen as shown in FIG. 12.

By projecting images of the slides $7_1$, $7_2$ and $7_3$ on the screen 9 and varying the hue, saturation and lightness or their combination of the colored image produced by the third projection apparatus 76, it is possible to vary colors continuously on the screen 9. By substituting another slide having a different background scenery for the slide $7_1$ in the first projection apparatus 74, it is possible to vary the background scenery of the colored picture on the screen 9. By replacing the slide $7_2$ in the second projection apparatus 75 by a slide having a picture of an automobile having high lights in different areas, it is possible to impress the viewers differently with the material and glossiness of the body.

When it is desired to study the arrangement of colors in providing an automobile of the body in a two tone combination or three tone combination or in any color pattern as desired, additional projection apparatus are mounted side-by-side and suitable slides are used with the projection apparatus.

The invention has been described with reference to an embodiment in which the invention is used for studying the color of an automobile. It is to be understood that the invention can have application in any other studies, for example a study on the arrangement of colors in clothes or glossiness of the material or a study on the coloring of packages and containers.

Figure 13:
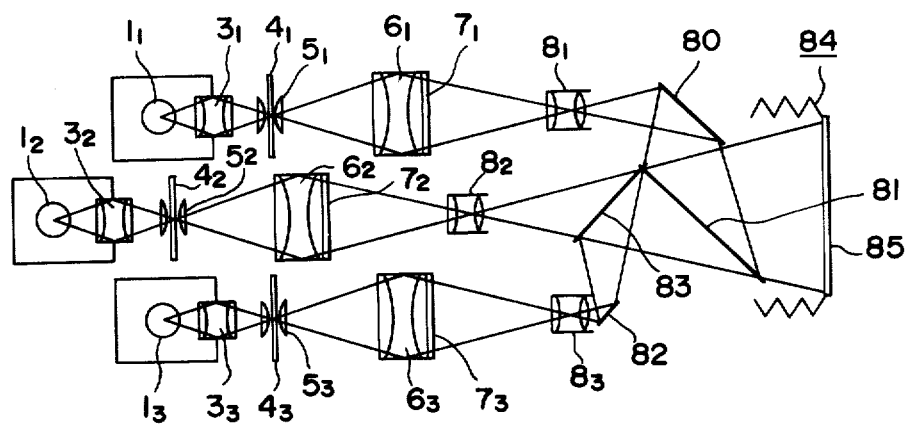
FIG. 13 is a view in explanation of the principle of forming an image on a film in a photographic camera to expose by several projection apparatus according to the invention arranged side-by-side.

Besides projecting an image on the screen, the projection device according to the invention can form an image on a film in a photographic camera and exposure the film. When the film is exposed, the size of the film is so small that it is not possible to space the film from the projection lens a great distance. Because of this, parallel light beams emanating from the three projection apparatus arranged in staggered relationship as shown in FIG. 13 are refracted by reflectors 80, 81, 82 and 83 and the optical axes of the three light beams are combined into a single optical axis before an image is formed on a film 85 in a photographic camera 84.

What is claimed is:

1. A projection apparatus using an additive mixture of colors comprising a lamp serving as a light source, a first condenser lens arranged in a position in front of the light source for collecting light emanating from said lamp and forming an image of a filament of the lamp in an area in front of the lens, a color mixing filter assembly disposed in a position in which said image of said filament of said lamp is formed by said first condenser lens, said color mixing filter assembly comprising a plurality of filter elements different in hue from one another and each varying in saturation gradually from one end thereof to the other and arranged whereby the hue is varied in the order of the wavelengths when said filter elements are moved in a direction normal to that direction in which the saturation of the filter element is varied, a second condenser lens arranged in a color mixing zone disposed forwardly of the assembly for collecting light colored by said filter assembly, a slide disposed in a forward position in the vicinity of said second condenser lens, and a projection lens disposed forwardly of the slide for projecting an image of said slide onto a screen disposed forwardly of said projection lens.

2. An apparatus according to claim 1 wherein said filament of said lamp emits light having a spatial expanse, and said filter elements are of the stepped wedge type and each varying in saturation in steps so that one end thereof is darkest and the color becomes lighter in going toward the other end.

3. An apparatus according to claim 1 wherein said filament of said lamp emits light of a linear form, and said filter elements are of the wedge type and continuously varying in saturation from one end thereof to the other.

4. An apparatus according to claim 1 further comprising a field lens disposed in the vicinity of said color mixing filter assembly for projecting light emanating from said first condenser lens to said second condenser lens, and a lightness adjusting plate disposed movably in the vicinity of said field lens for adjusting lightness.

5. An apparatus according to claim 1 further comprising a field lens disposed substantially in the same plane as said color mixing filter assembly for projecting light emanating from a main surface of said first condenser lens on to the main surface of the second condenser lens.

6. An apparatus according to claim 4 further comprising a feed screw connected to the shaft of a first motor and adapted to move horizontally said lightness adjusting plate as said first motor rotates, a pair of limit switches spaced apart from each other for a predetermined distance inn order to limiting the horizontal movement of said lightness adjusting plate, a feed screw connected to the shaft of a second motor and adapted to move horizontally said color mixing filter assembly for varying hue as said second motor rotates, a feed screw connected to the shaft of a third motor and adaptd to move vertically said color mixing filter assembly for varying saturation as said third motor rotates, and two pairs of limit switches each pair being spaced apart from each other for a predetermined distance and one pair is adapted to limit the horizontal movement of the color mixing filter assembly while the other pair is adapted to limit the vertical movement of the color mixing filter assembly.

7. An apparatus according to claim 6 further comprising three counters coupled to said motors for adjusting lightness, hue and saturation respectively, one counter being adapted to count and indicate the distance covered by the horizontal movement of said lightness adjusting plate, another counter being adapted to count and indicate the distance covered by the horizontal movement of said color mixing filter assembly for varying hue and still another counter being adapted to count and indicate the distance covered by the horizontal movement of said color mixing filter assembly for varying saturation.

* * * * *